(12) United States Patent
AbuGhazaleh et al.

(10) Patent No.: US 10,404,017 B2
(45) Date of Patent: Sep. 3, 2019

(54) PLUG LOAD RECEPTACLE

(71) Applicant: Hubbell Incorporated, Shelton, CT (US)

(72) Inventors: Shadi Alex AbuGhazaleh, Guilford, CT (US); Joe Dupuis, Ledyard, CT (US); David Peck, Danbury, CT (US)

(73) Assignee: Hubbell Incorporated, Shelton, CT (US)

( * ) Notice: Subject to any disclaimer, the term of this patent is extended or adjusted under 35 U.S.C. 154(b) by 300 days.

(21) Appl. No.: 15/272,909

(22) Filed: Sep. 22, 2016

(65) Prior Publication Data

US 2017/0085070 A1 Mar. 23, 2017

Related U.S. Application Data

(60) Provisional application No. 62/222,148, filed on Sep. 22, 2015.

(51) Int. Cl.
| | |
|---|---|
| *H01R 13/652* | (2006.01) |
| *H01R 13/707* | (2006.01) |
| *H01R 13/703* | (2006.01) |
| *H01R 24/78* | (2011.01) |
| *H01R 25/00* | (2006.01) |
| *H02G 3/18* | (2006.01) |
| *H01R 103/00* | (2006.01) |
| *H01R 13/66* | (2006.01) |

(52) U.S. Cl.
CPC ....... *H01R 13/707* (2013.01); *H01R 13/7038* (2013.01); *H01R 24/78* (2013.01); *H01R 13/652* (2013.01); *H01R 13/6658* (2013.01); *H01R 25/006* (2013.01); *H01R 2103/00* (2013.01); *H02G 3/18* (2013.01)

(58) Field of Classification Search
CPC .................................................. Y10T 307/461
See application file for complete search history.

(56) References Cited

U.S. PATENT DOCUMENTS

| | | | | |
|---|---|---|---|---|
| 4,930,047 A | * | 5/1990 | Peterson | ............... H01R 25/003 200/51 R |
| 5,424,903 A | * | 6/1995 | Schreiber | ................ G06F 1/266 307/40 |
| 6,462,976 B1 | | 10/2002 | Olejniczak et al. | |

(Continued)

OTHER PUBLICATIONS

PCT/US2016/053045 International Search Report and Written Opinion dated Dec. 9, 2016 (12 pages).

(Continued)

*Primary Examiner* — Fritz M Fleming
(74) *Attorney, Agent, or Firm* — Michael Best & Friedrich, LLP (57) ABSTRACT

A controlled receptacle device provides power to connected devices when certain predetermined conditions are met. A wired or wireless control signal is received by the receptacle to control a switch within the receptacle device to open or close based on the predetermined conditions. In a duplex receptacle configuration either one or both of the outlets within the device are controlled by the control signal. In the condition where only one of the two outlets is controlled, the other outlet is wired to always be on, or providing power to the face terminals of the outlet.

16 Claims, 10 Drawing Sheets

(56) References Cited

U.S. PATENT DOCUMENTS

| | | | |
|---|---|---|---|
| 6,529,139 B1 * | 3/2003 | Behun | A63H 30/04 340/12.5 |
| 2001/0022301 A1 | 9/2001 | O'Donnell | |
| 2003/0067224 A1 | 4/2003 | Tai | |
| 2003/0103304 A1 | 6/2003 | Rendic | |
| 2009/0215319 A1 * | 8/2009 | Gandhi | H01R 13/7038 439/654 |
| 2011/0102953 A1 | 5/2011 | Bonilla et al. | |
| 2012/0326514 A1 | 12/2012 | Kim et al. | |
| 2014/0132084 A1 | 5/2014 | Pham et al. | |
| 2015/0236453 A1 * | 8/2015 | Magee, Jr. | H01R 13/70 307/40 |

OTHER PUBLICATIONS

European Patent Application No. EP16849572 Supplementary Search Report dated Mar. 28, 2019 (7 pages).

* cited by examiner

PLUG LOAD RECEPTACLE

CROSS-REFERENCE TO RELATED APPLICATION

This application claims the benefit of prior-filed, U.S. Provisional Patent Application No. 62/222,148, filed Sep. 22, 2015, the entire contents of which are incorporated herein by reference.

BACKGROUND

The need to conserve energy is constantly growing. Driven by the rising cost of energy, environmental considerations and governmental regulation, energy-consuming devices and their circuits are increasingly becoming the focus of energy controls. Traditionally, energy management programs focused primarily on lighting loads within a particular space, for example, coupling the activation of the lighting device(s) to the occupancy status of the space. As a result, the majority of lighting circuits became controlled to minimize wasted energy consumption and the focus then turned to plug loads—devices connected to the electrical infrastructure through the traditional wall outlet. This includes all devices that are left "ON", e.g., those devices that draw electrical current, when the space is unoccupied.

Devices such as computer monitors, phone and laptop chargers, and task lighting, to name a few, draw a constant level of power regardless of whether anyone is in the room. Even when in standby mode the constant power draw of many of these devices is a measurable percentage of the overall premise energy consumption, particularly when the space is unoccupied, and the lights are "OFF". These so-called plug loads have been recognized as a substantial energy-consuming group of devices. They are the subject of regulation and efficiency efforts that require plug loads to be turned off through occupancy or timer-based systems.

One exemplary standard that is driving the implementation of plug load controls is ASHRAE 90.1, which requires that 50% of receptacles in commercial (e.g., office) installations be controlled to limit power consumption to an acceptable, i.e., efficient, level. This standard is often referenced by environmental programs, such as LEED, which stands for Leadership in Energy & Environmental Design, and is also referenced by local codes as the standard for electrical installation efficiency. LEED is a green building certification program that recognizes best-in-class building strategies and practices. To receive LEED certification, building projects must first satisfy prerequisites and then earn points to achieve different levels of certification.

There are some known solutions that were developed to address the need to control plug loads such as those identified above. These known solutions typically take on one of three forms, Power Packs, Relay Panels (Automated Breakers) and Controlled Receptacles. Thus, the basic concept of a controlled receptacle has been known in the industry. However, the receptacle solutions currently available are all end-unit controlled receptacles. Furthermore, these units are limited in the amount of switchable current they control.

Switching, or controlled, receptacles currently on the market are typically limited in the amount of electrical current they are capable of switching. In some cases, the relay is rated well short of the maximum load currents specified for the various outlet types (e.g., 12 A from a 15 A receptacle, or 16 A from a 20 A receptacle).

Additionally, due in part to the above-mentioned electrical current limits, and partly due to space requirements, currently available controlled receptacles are typically limited to control of the individual receptacle and its built-in outlets. This can vary between switching both plugs of an outlet or just one of the two outlets of a typical duplex receptacle. In all cases, however, there is no controlled output circuit to further control additional outlets or receptacles "downstream" from the controlled device. As a result, these types of controlled receptacles require a separate device at each controlled point.

SUMMARY OF THE DISCLOSURE

In consideration of problematic issues associated with related art controlled receptacle devices, including but not limited to the problematic issues discussed above, a device in accordance with one or more exemplary embodiments of the present application generally relates to a plug load receptacle controllable by one or more of a wired or wireless control scheme. Sensors and/or other control devices are used to control whether an electrical receptacle is turned ON or OFF. That is, depending on various conditions, such as time of day, ambient light, heat, certain date, other environmental conditions, etc., power to the receptacle contacts is shut off, or turned on.

Further embodiments afford full rated switching and downstream feed capabilities. More particularly, in accordance with one or more embodiments consistent with this disclosure a robust switching mechanism (e.g., a relay) is utilized that is capable of controlling virtually any level within the rated range of the entire branch circuit. As a result, it is possible to switch one or both outlets in the face of a duplex receptacle and provide, for example, a 15-amp or 20-amp output for feeding (switching) downstream receptacles. This configuration provides users with the most value and lowest total cost of ownership.

According to one exemplary embodiment a wiring device is disclosed which has a housing including front and rear sections, an AC power input for receiving AC power to the device from a power source external to said housing, a low voltage control input for receiving a low voltage control signal, one or more AC power outputs for providing the AC power to a connected device, and a switching device receiving the control signal and electrically connecting said AC power input to the one or more AC power outputs based on the control signal.

According to a further embodiment, a wiring device is disclosed which includes a housing with front and rear sections, an AC power input for receiving AC power to the device from a power source external to said housing, a wireless control input for receiving a wireless control signal, a circuit configured to receive the wireless control signal and output a low voltage control signal, one or more AC power outputs for providing the AC power to a connected device, and a switching device the receives the control signal and electrically connects the AC power input to the one or more AC power outputs based on the control signal.

According to yet further embodiments the switching device includes a robust magnetic relay that can switch up to 16 amperes, or more, of AC power. Still further embodiments include first and second face terminals for providing electrical power to two respective electrical devices, the first face terminal being activated based on the control signal and said second face terminal being continuously activated whenever AC power is connected to the device.

BRIEF DESCRIPTION OF THE DRAWINGS

Exemplary embodiments of the disclosed invention are described in detail below by way of example, with reference to the accompanying drawings, in which.

DETAILED DESCRIPTION OF EXEMPLARY EMBODIMENTS

Exemplary embodiments of devices consistent with the present application include one or more of the novel mechanical and/or electrical features described in detail below. For example, one or more of the exemplary embodiments of the devices disclosed herein include a housing, an AC power input for receiving AC power to the device from a power source external to the housing, one or more AC power outputs for providing AC power to a connected device if predetermined control conditions are present and a switch disposed within the housing for connecting the AC power received by the AC power input to the one or more AC power outputs based on the predetermined control conditions.

Figure 6:
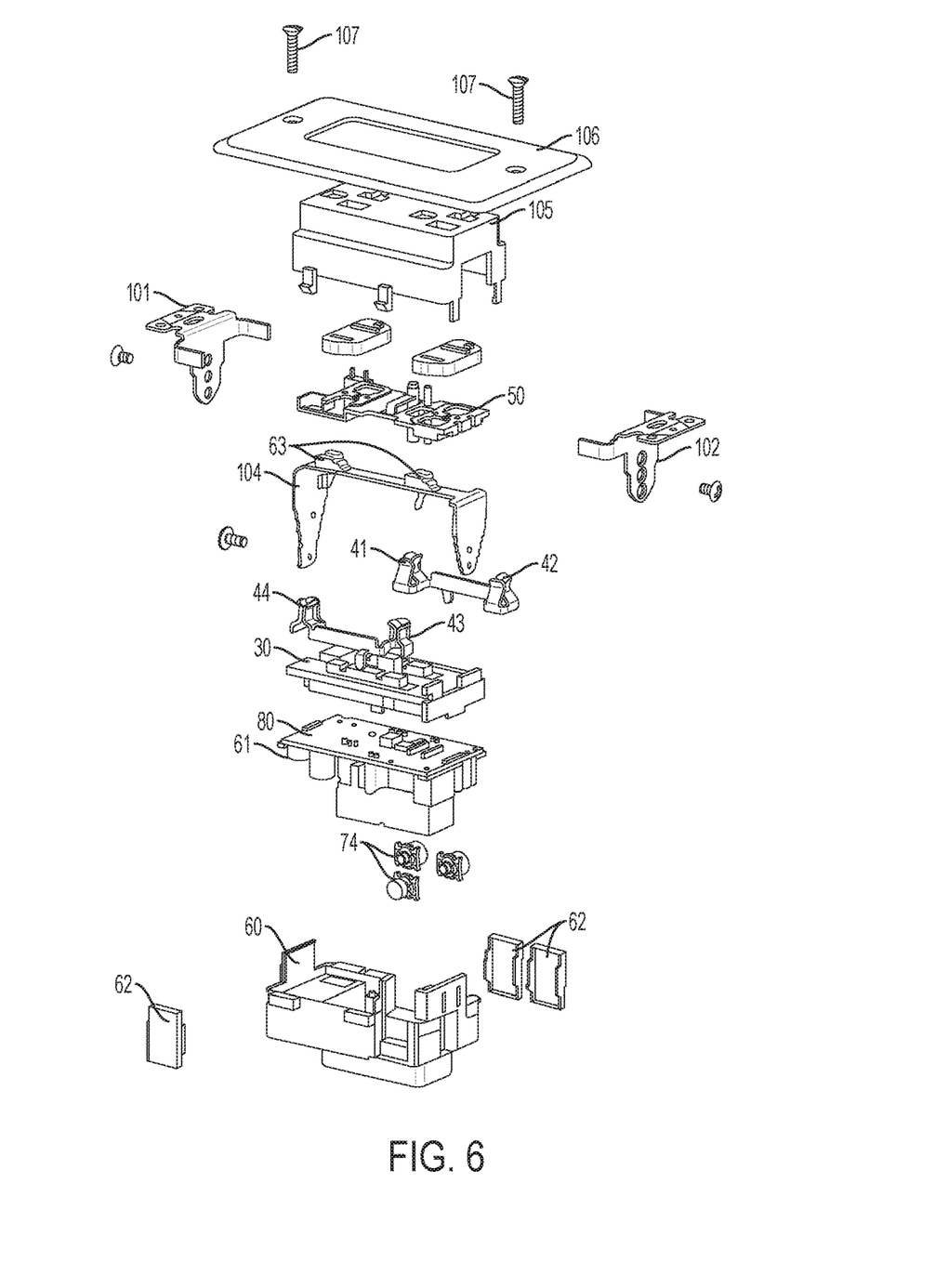
FIG. 6 is an exploded view of a controlled receptacle in accordance with one exemplary embodiment of the application.

Referring to FIG. 6, an exemplary embodiment of a controlled receptacle in accordance with the application includes a housing having receptacle base 60 into which circuit assembly 61 fits. Circuit assembly 61 includes printed circuit board (PCB) 80. Terminals 74 connect to PCB 80 (FIG. 8) and are covered by terminal covers 62. Insulator 30 receives plug, or face, terminals 41-44 disposed on two separate conductive arms in the particular embodiment shown in FIG. 6. An alternative embodiment is also shown and discussed below where the face terminals are separated onto three different conductive arms.

Grounding bar 104 attaches to the housing, 60 (rear), 105 (face), and also includes face ground terminals 63 for connecting the ground plug terminal of the connected powered device to the grounded plug load receptacle housing. Contact insulator 50 fits over the grounding bar 104 and face terminals 41-44 to hold them in place and provide electrical insulation. Optional tamper resistant mechanisms 65 are provided for each outlet and prevent anything from entering the outlet face terminals unless all three corresponding plug terminals are being connected to the outlet, i.e., hot, neutral and ground, plug terminals.

Figure 1:
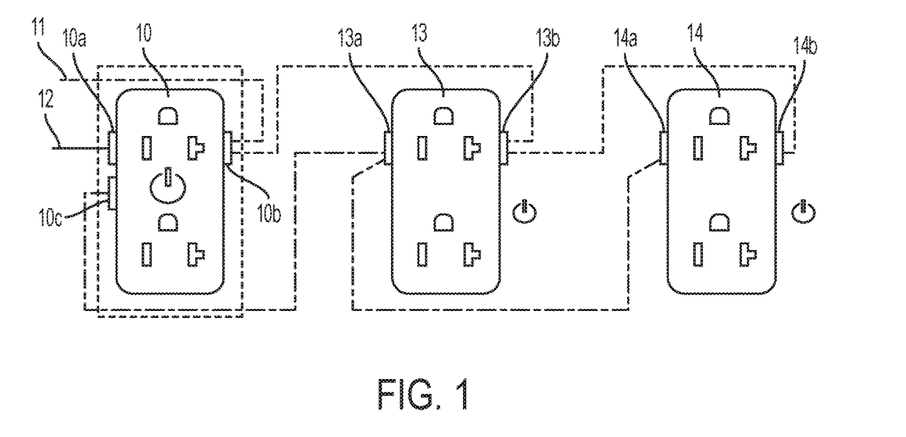
FIG. 1 is an illustration of a controlled duplex receptacle connected to two conventional duplex receptacles in accordance with a first exemplary embodiment of the application.

Exemplary devices include fully rated switching and a downstream feed. In accordance with one or more embodiments consistent with this disclosure, a robust switching mechanism (e.g., a relay) is utilized that is capable of controlling virtually any power level within the rated range of the entire branch circuit. As a result, referring to FIG. 1, it is possible to switch one or both outlets in the face of a duplex receptacle and provide, for example, a 15-amp or 20-amp output for feeding (switching) downstream, i.e., "switched," receptacles.

As shown, attached to controlled receptacle 10 is a neutral input line 11 and a hot input line 12. Hot line input 12 is connected to line input terminal 10a and neutral line 11 is connected to neutral input terminal 10b. The neutral is common to all branch receptacles and, thus, neutral line 11 is also connected to the neutral input terminals of switched receptacles 13 and 14 at neutral input terminals 13b and 14b, respectively. Controlled receptacle 10 further includes feed through terminal 10c which provides a switched line output connected to the respective line input terminals 13a and 14a of switched receptacles 13 and 14. This exemplary configuration provides users with significant value and a low total cost of ownership. Although the configuration of the embodiment shown in FIG. 1 includes a single controlled receptacle with feed through (10) and two switched receptacles (13, 14), one of ordinary skill will understand that more or less switched receptacles can be implemented as well as additional controlled receptacles.

Figure 2:
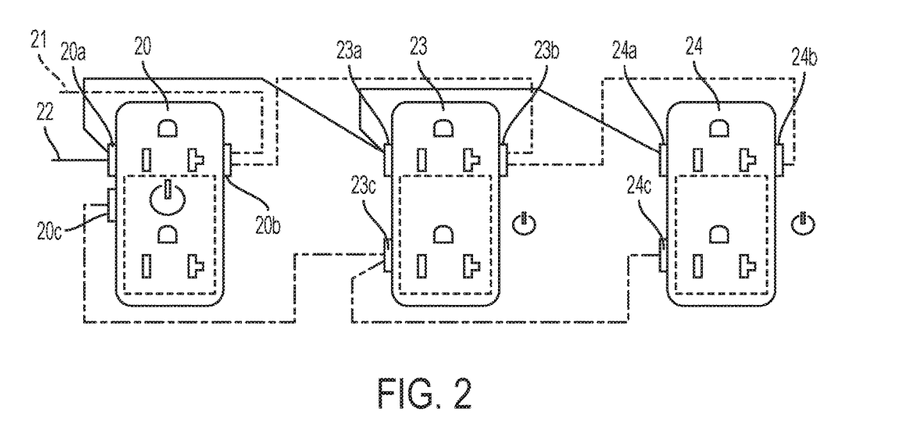
FIG. 2 is an illustration of a controlled duplex receptacle connected to two additional controlled duplex receptacles in accordance with a second exemplary embodiment of the application.

For example, in accordance with a further embodiment, illustrated in FIG. 2, one of the two outlets in each of a string of duplex receptacles is controlled while leaving the other outlet in each receptacle hard-wired, e.g., always hot whenever the mains power is active. As shown, hot input line 22 is connected to the respective line input terminals 20a, 23a and 24a of split-controlled receptacle with switched feed through 20 and split receptacles 23, 24. As indicated by the dashed lines, in this embodiment the lower outlet in each receptacle is controlled/switched and the upper outlet is hard-wired.

Wireless control of the controlled receptacles in accordance with various embodiments is implemented through one or more communication protocols, such as IEEE 802 and its variants, e.g., Zigbee®, Ethernet®, Bluetooth®, Clear Connect® and so on. Most of these protocols include a pairing, or association, sequence that identifies the controlling device (e.g., sensor, control panel, etc.) to the controlled devices (e.g., a receptacle, such as receptacles 10 (FIG. 1) and 20 (FIG. 2), above, so that the receiving device only responds to the control signals from the desired transmitter(s).

According to further exemplary embodiments the receptacles can be controlled through direct wire control. One challenge encountered in conventional controlled receptacles has been maintaining isolation between the high-voltage (typically 120 VAC) power and the low voltage (typically Class 2) control signal. According to one or more embodiments a means is provided that maintains this isolation and, further, meets safety requirements and applicable codes.

FIG. 6 shows an exploded view of a controlled receptacle in accordance with an exemplary embodiment of the application. The description of several of the independent components is discussed in more detail below in reference to FIGS. 3-5 and 7-12.

Figure 3:
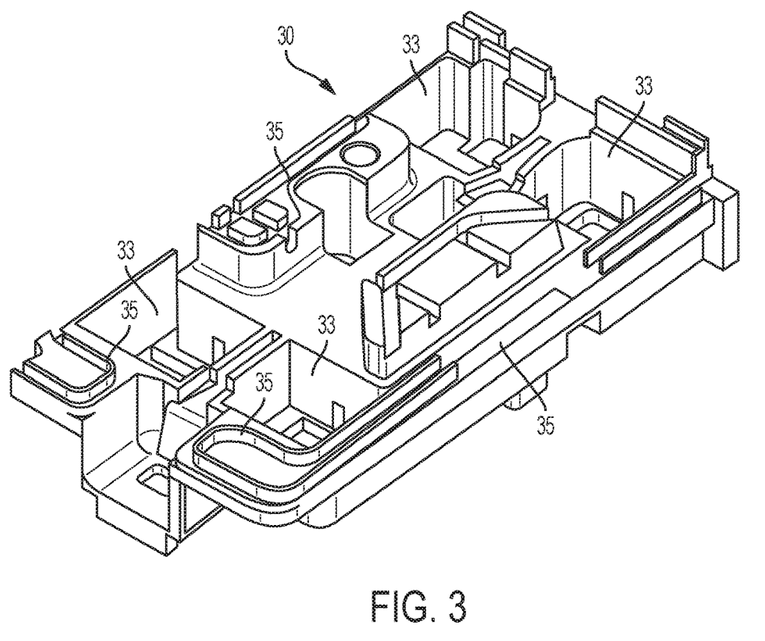
FIGS. 3 and 4 show a terminal insulator in accordance with various exemplary embodiments of the application.
Figure 4:
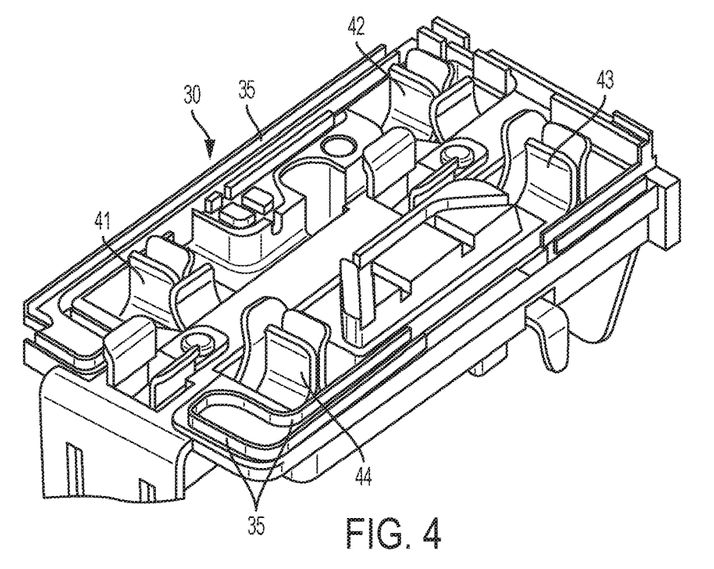

FIGS. 3 and 4 show a terminal insulator 30 in accordance with various exemplary embodiments. Terminal insulator 30 serves to isolate the conductive plug terminals 41-44 from the printed circuit board (PCB, 80 in FIG. 6) and its components. Terminal insulator 30 also includes terminal cavities 33 in which the respective conductive plug terminals 41-44 are disposed, and between the plug terminals and the ground contacts. Insulator 30 further provides an antenna channel 35 for routing the antenna, maintaining the isolation between the antenna and the high-voltage contacts. Accordingly, insulator 30 separates the high voltage AC power lines from the lower voltage control signals on PCB 80.

Figure 5:
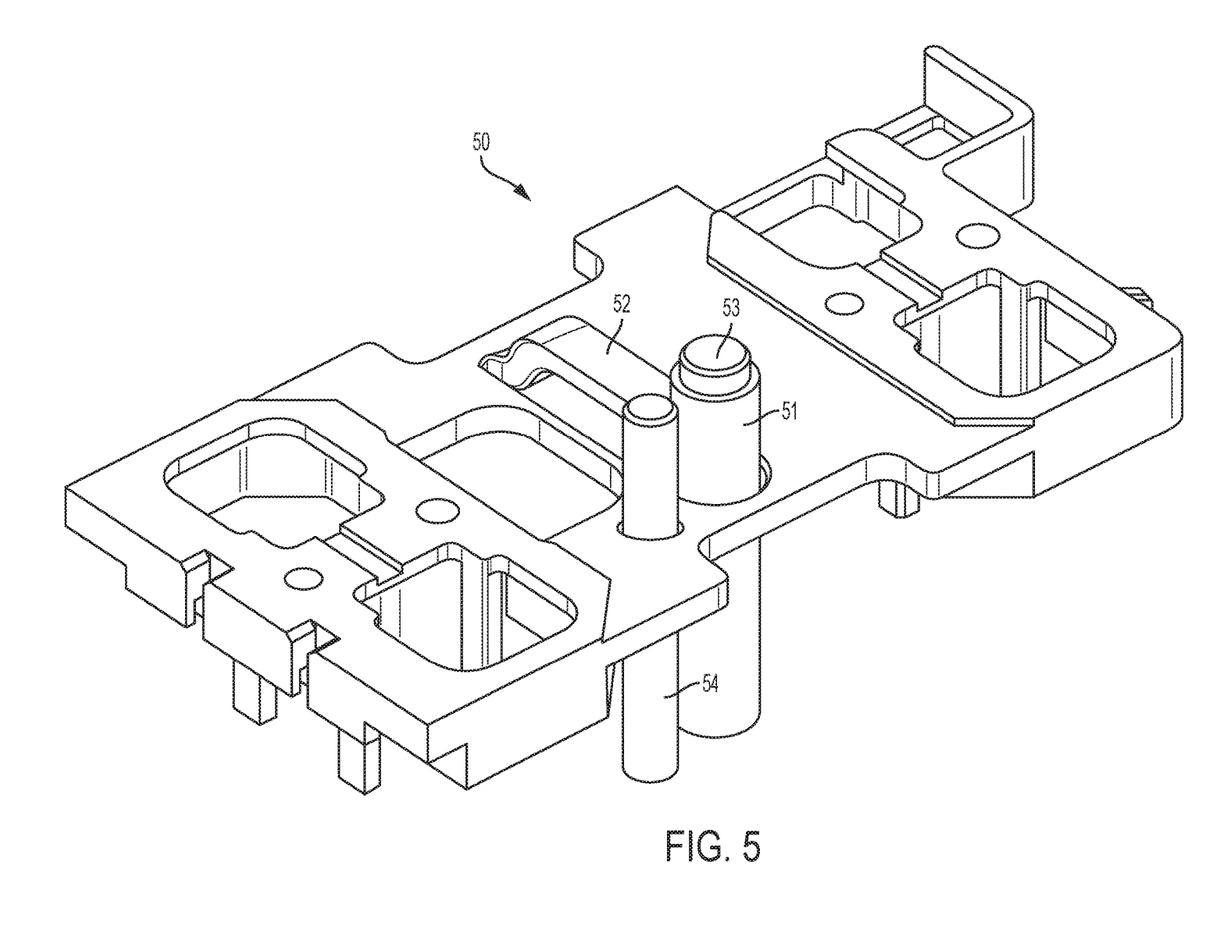
FIG. 5 is a top molded contact insulator embodiment in accordance with various exemplary embodiments of the application.

Referring to FIG. 5 a top molded insulator 50, made of clear material in the present embodiment, serves as a contact insulator. In addition to the functions described below insulator 50 supports optional tamper-resistant (TR) mechanism(s) (65 in FIG. 6) when such mechanisms are utilized in the receptacle.

According to this embodiment, a button actuator cylinder 51 is held in place with a mechanical beam arm 52. Button actuator 51 is accessible through the face of the receptacle and sits on top of a PCB mounted push-button located on PCB 80 (FIGS. 6 and 8), which according to the present embodiment is a momentary-on switch. When the rod is depressed, by pressing button actuator 53, the movement of the arm allows the depression of the PCB-mounted push button below to actuate the relay switch and turn OFF the receptacle. Light pipe 54 brings light to the face of the receptacle from a PCB mounted LED to indicate the status of the controlled receptacle.

Referring to FIGS. 7A-7D, conductive wire terminal 74 has stakes, or legs, 70-73 and a PCB tail 75 in accordance with the present embodiment.

Figure 7A:
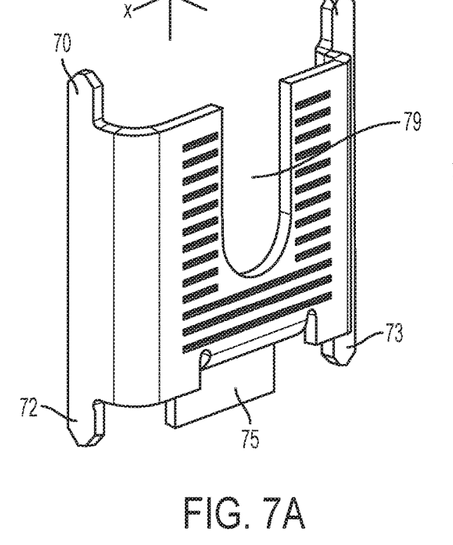
FIGS. 7A-7D illustrate a terminal connector for a plug load device in accordance with an exemplary embodiment.
Figure 7B:
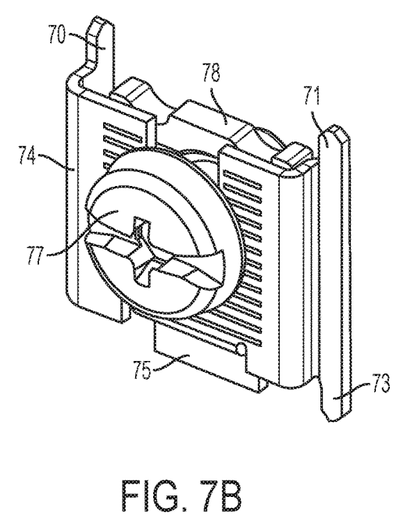
Figure 7C:
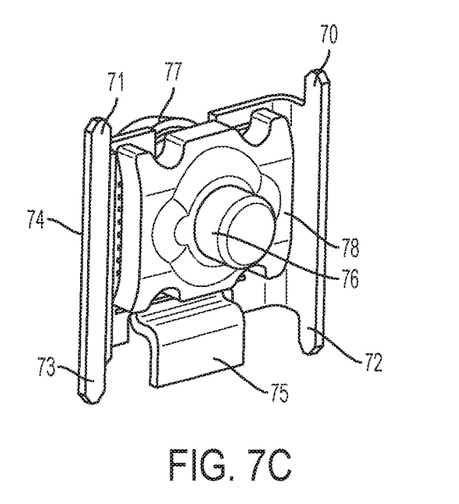
Figure 7D:
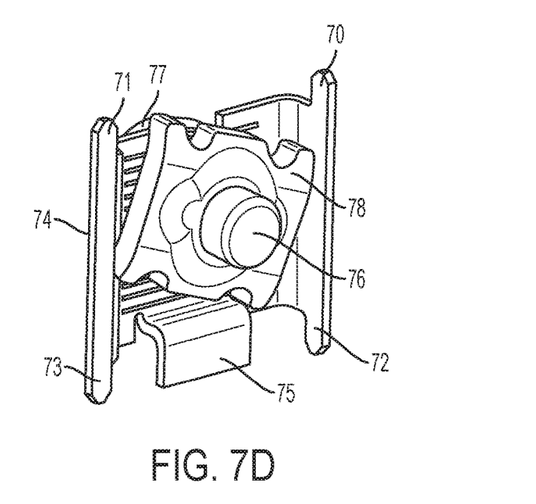

The top legs 70, 71 and bottom legs 72 and 73, act as stabilizing members when engaged with the housing of the device. As shown, according to this and other embodiments, legs 70-73 are narrow, substantially planar, structures oriented perpendicular to one another. Specifically, top legs 70 and 71 are perpendicular to each other and bottom legs 72 and 73 are perpendicular to each other. When engaged in the body housing this relative orientation provides stability in two dimensions, e.g., legs 70 and 72 provide stability in the x-direction and legs 71 and 73 provide stability in the y-direction. Bottom legs 72, 73 and tail 75, in addition to providing stability, also provide a sufficient current path from the wires, which are connected to terminal screw 77 when the device is installed, to the PCB. As illustrated in FIGS. 7C and 7D, tail 75 further prevents the wire retention nut 78 from rotating too far and contacting the PCB (80 in FIG. 6 and FIG. 8), which could potentially damage the PCB. This also ensures adequate contact between the terminals and the wires. That is, as shown, the terminal screw is disposed in slot 79 of terminal 74. The head 77 of the terminal screw is on the front side of the terminal 74 (FIG. 7B) and retention nut 78 is screwed onto the body 76 of the screw on the back side of terminal 74 (FIGS. 7C and 7D).

Figure 8:
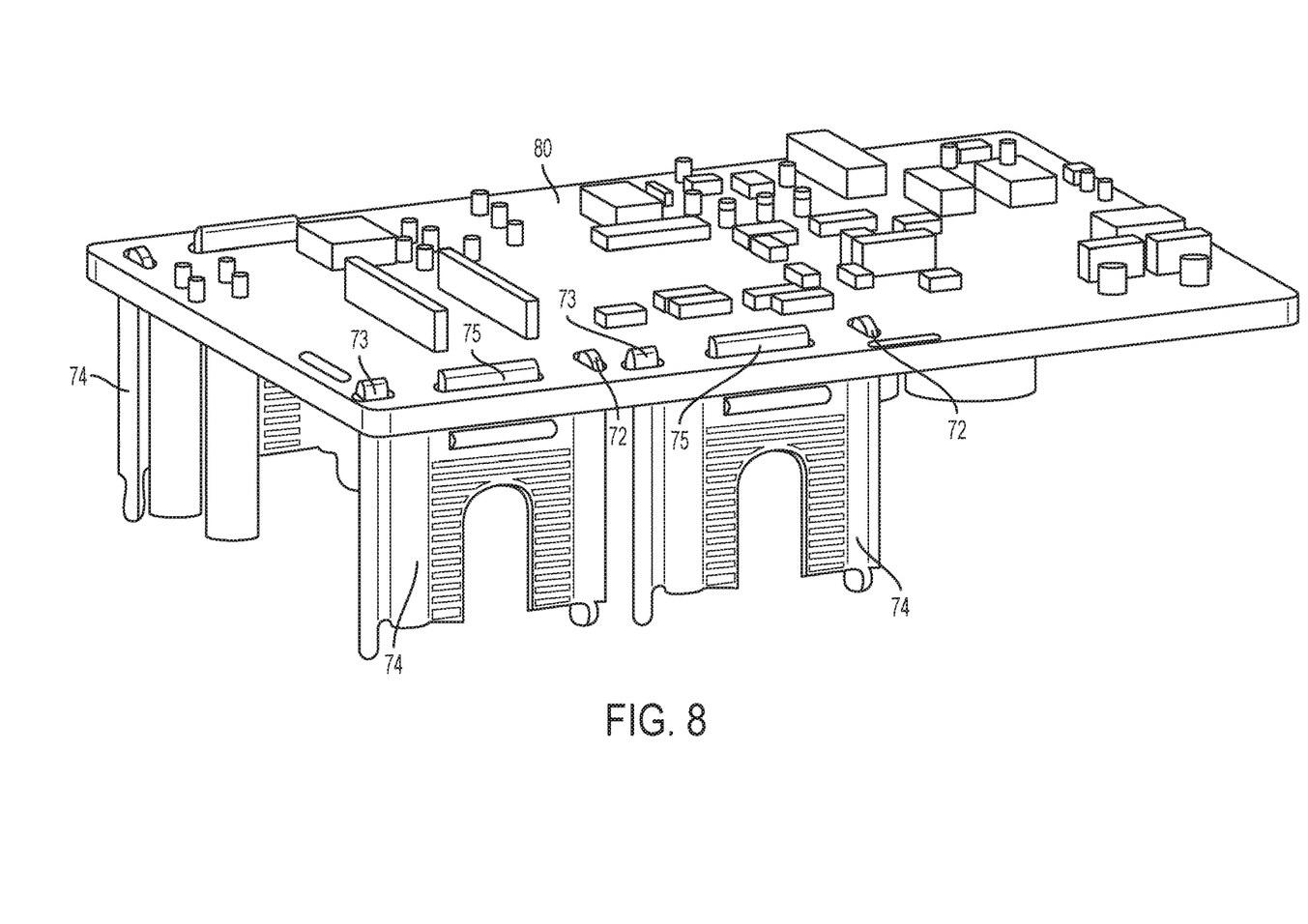
FIG. 8 illustrates a printed circuit board and a plurality of connected terminals in accordance with an exemplary embodiment.

FIG. 8 shows how terminals 74 are engaged with the PCB 80. As shown, the bottom legs 72 and 73 and tail 75 of terminals 74 protrude through holes in the PCB 80.

Figure 9A:
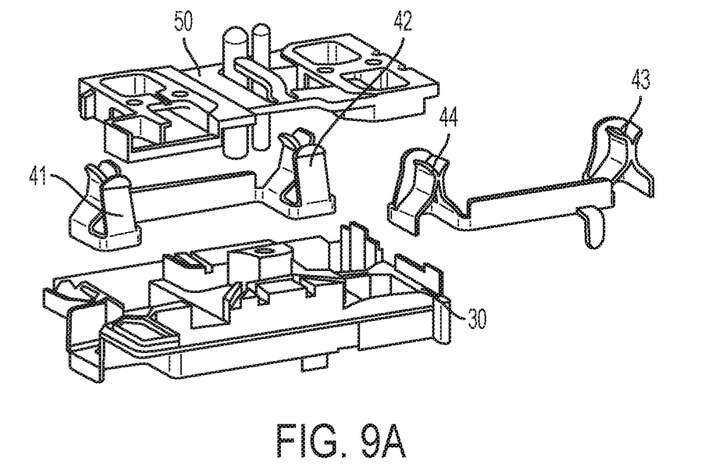
FIG. 9A illustrates a plug load receptacle where both outlets of a duplex receptacle are controlled in accordance with an exemplary embodiment.
Figure 9B:
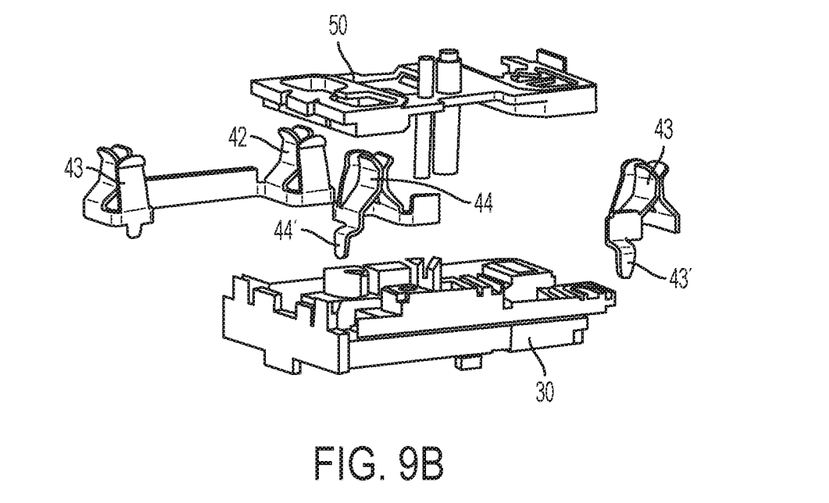
FIG. 9B illustrates a plug load receptacle where one of the outlets of a duplex receptacle is controlled and the second outlet is always on, in accordance with an exemplary embodiment.

FIGS. 9A and 9B show two different exemplary embodiments. In the embodiment shown in FIG. 9A, both outlets in the face of a duplex receptacle are controlled simultaneously. In the other embodiment, illustrated in FIG. 9B, only one outlet is controlled while the other is always ON. This is accomplished using different tap points, 43' and 44', that connect to the PCB at a point that corresponds to the switched output vs. the input line connection.

Figure 10A:
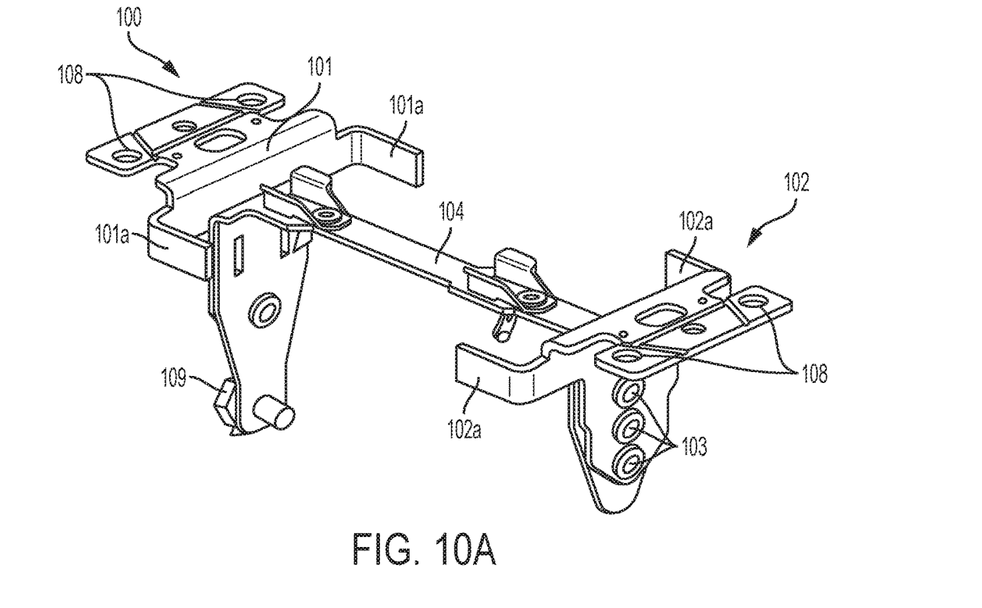
FIGS. 10A-10C illustrate an adjustable mounting bracket for a plug load receptacle in accordance with an exemplary embodiment.
Figure 10B:
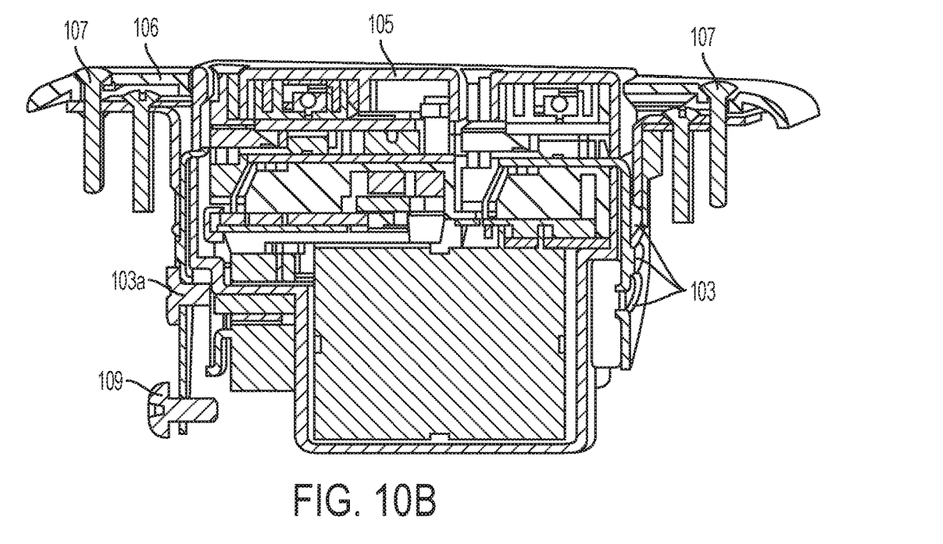
Figure 10C:
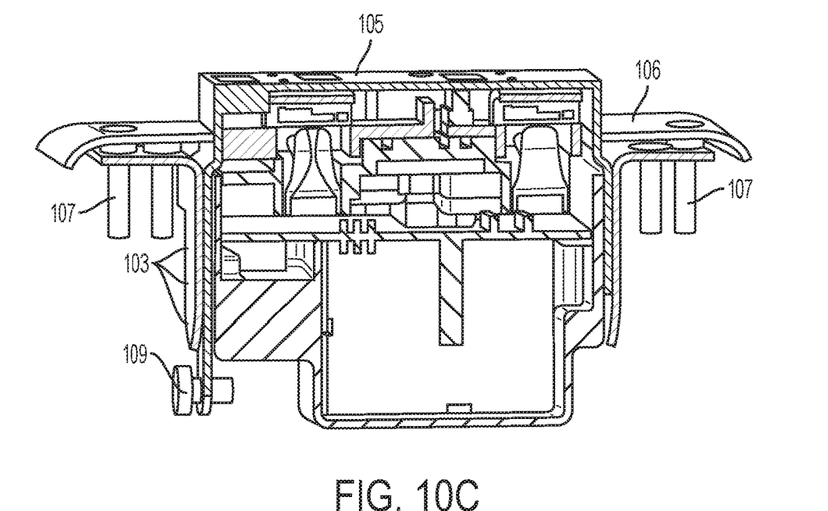

In accordance with one or more exemplary embodiments, adjustable mounting bracket 100, as shown in FIGS. 10A-10C, allows the plug load receptacle device to be mounted in shallow, e.g., older legacy, boxes with the receptacle face protruding by the maximum allowable standard height. Bracket 100 can also be adjusted for standard boxes so that the receptacle face is much closer to being completely "flush" with the plate, only protruding by about an eighth ($1/8^{th}$) of an inch. As an added benefit, the ability to raise the receptacle face may help move the antenna further out of a metallic wall plate, thus improving the Radio Frequency (antenna) performance, e.g., when the wireless control embodiment is employed.

In particular, bracket 100 has two opposing ends, 101 and 102. Each of the two sides, 101 and 102, includes a plurality of adjustment holes 103 (3 adjustment holes are shown in FIG. 10A). Ends 101 and 102 are attached to grounding bar 104 by an attachment mechanism, such as a screw 103a, rivet or another adequately conductive attachment means, via one of the three adjustment holes 103. Depending on which of the three holes is used, the housing face 105 of the plug load receptacle protrudes from the faceplate 106 by a different amount. As shown in the exemplary embodiment, the maximum amount face 105 can protrude from the faceplate 106 is 0.33-inches (for example if the top hole of the three holes 103 is used to attach the plug load receptacle to the grounding bar 104). Alternatively, if the bottom hole 103 is used, as shown in FIG. 10B, the minimum distance between face 105 and faceplate 106 is approximately 0.08-inches.

Faceplate 105 is attached to ends 101 and 102 of bracket 100 via screws 107 or some other appropriate attachment means, via holes 108 in bracket 100 (FIG. 10A). Also, at least one of ends 101 and 102 includes a grounding screw 109 for attaching a ground wire (not shown) to electrical ground. Ends 101 and 102 of bracket 100 also include support arms 101a and 102a, respectively, to support the corners of faceplate 106.

Wire Controlled Receptacle

Figure 11:
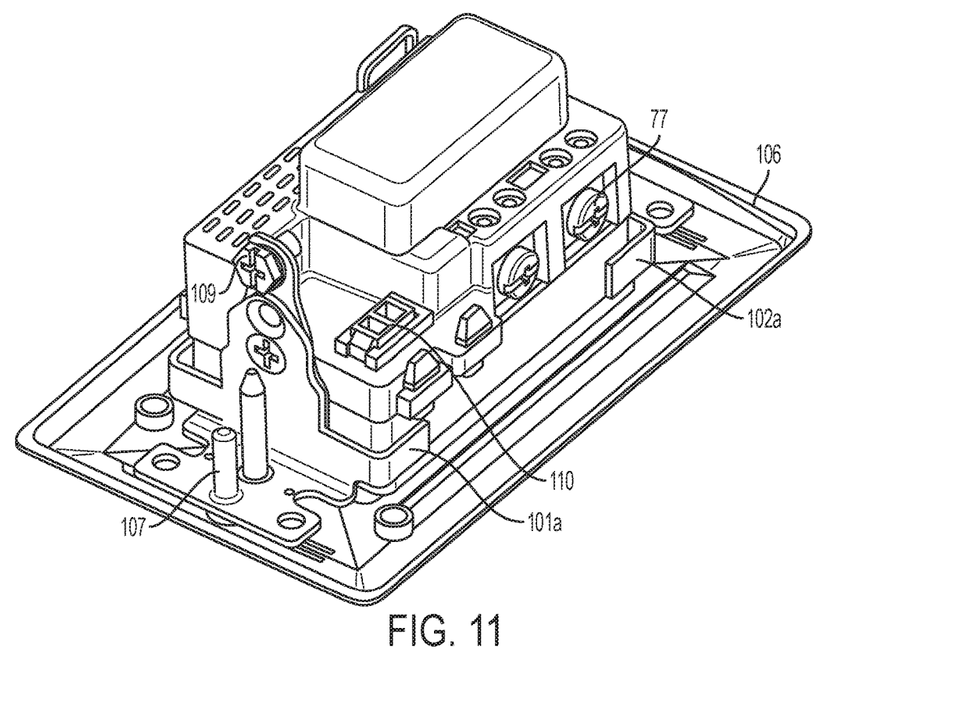
FIG. 11 illustrates a wired connection for controlling the plug load receptacle in accordance with an exemplary embodiment.

Referring to FIG. 11, one control option for receiving low voltage control signals to control the AC power output of the receptacle in accordance with exemplary embodiments includes a wired connection to the plug load receptacle via connector 110 that can be driven by a control signal. According to various embodiments the control signal is provided from a sensor, such as an occupancy sensor, a timer, a remote management panel or any combination thereof (not shown). This wired connection can be low voltage signal, a communication signal or a line voltage sense wire that can be used to determine the desired status of the receptacle.

Control Configurations—Internally, several base control configurations are possible in accordance with various exemplary embodiments. Some of these exemplary base configurations are outlined below.

OCC+GND, internal ac/dc supply: The device derives low voltage for operation and driving the relay internally. A reference ground and a control signal (typically occupancy signal from a sensor, but can be configured to receive multiple signals that result in different operation—such as a momentary switch for manual ON vs. automatic activation).

OCC, GND, +24V DC Power Input: A variation of the OCC+GND option above, where power is not derived internally from the a/c supply, but taken from an external low voltage source.

OCC, GND, +24V DC Power Output: Internally derive the low voltage power required for operation. Also derive sufficient low voltage to drive other devices such as sensors or other controls. Receives control signal(s).

Low voltage connector: For low-voltage WIRED control of the receptacle, a low voltage connector/connection is incorporated into the receptacle, for example, connector 110 in FIG. 11. This connector meets strict isolation and protection requirements for isolating the low voltage input signal from the AC power signal. The wired solution, e.g., connector 110, can be combined with wireless control or can stand as a separate option.

In one exemplary embodiment, the low voltage connector 110 receives a 24 VDC signal from a sensor that indicates occupancy (Vacancy) status so the receptacle can respond accordingly. There are many types of signals and communication protocols that can be used to control the receptacle or receive the status (bi-directional) of the receptacle. These include but are not limited to I2C, RS485, RS232, USB etc. In this embodiment, the connector has 2 or 3 terminals. However, it can have as many terminals as needed to implement the desired low voltage signaling or control.

Wireless Controlled Receptacle

Antenna Routing

Figure 12:
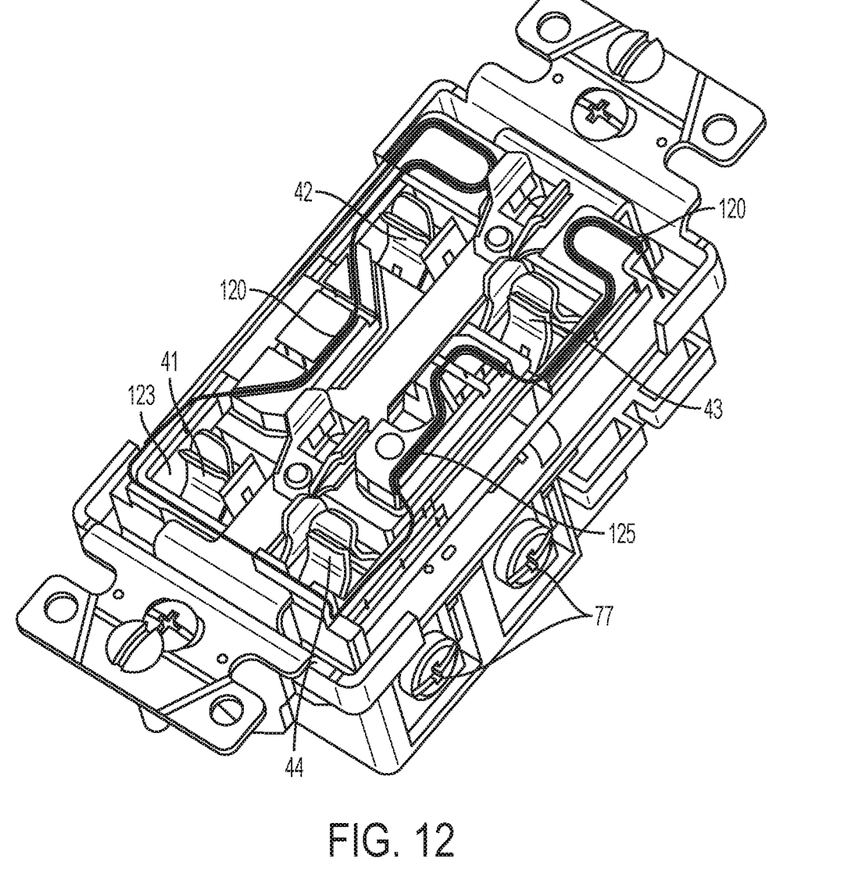
FIG. 12 illustrates a wireless configuration for controlling the plug load receptacle in accordance with an exemplary embodiment.

Referring to FIG. 12, an antenna 120 is routed through a channel 125 in an insulator 123. According to the embodiment shown, antenna 120 is a stranded flexible insulated wire antenna. However, in accordance with other embodiments antenna 120 is a semi-rigid insulated or un-insulated wire. Antenna 120 receives a wireless control signal from at least one control device, such as an occupancy sensor equipped with wireless output, and provides a signal to the PCB. A low voltage control signal is, thus, generated and the relay is driven to switch the outlet OFF, or ON depending on the status of the signal received from the occupancy sensor.

While various embodiments have been chosen to illustrate the invention, it will be understood by those skilled in the art that other modifications may be made without departing from the scope of the invention as defined by the appended claims.

What is claimed is:

1. A wiring device comprising:
a housing including front and rear sections;
an AC power input for receiving AC power to the device from a power source external to said housing;
a low voltage control input for receiving a low voltage control signal;
one or more AC power outputs for providing said AC power to a connected device;
a switching device receiving said control signal and electrically connecting said AC power input to said one or more AC power outputs based on said control signal; and
at least one terminal for carrying said AC power, said terminal including at least two top legs and two bottom legs, said top legs being perpendicular to each other and inserted into first corresponding apertures and said bottom legs being perpendicular to each other and inserted into second corresponding apertures in said housing.

2. The wiring device recited in claim 1 further comprising:
a printed circuit board (PCB) supporting said switching device.

3. The wiring device recited in claim 2 further comprising:
an insulator disposed between said PCB and said one or more AC power outputs and providing electrical isolation between said PCB and said one or more AC power outputs.

4. The wiring device recited in claim 3 wherein said one or more AC power outputs includes a single unitary electrically conductive arm having two face terminals for providing electrical power to two respective electrical devices.

5. The wiring device recited in claim 3 wherein said one or more AC power outputs includes first and second face terminals for providing electrical power to two respective electrical devices, said first face terminal being activated based on said control signal and said second face terminal being continuously activated whenever AC power is connected to the device.

6. The wiring device recited in claim 5 further comprising:
a cover plate having an aperture through which said front section of the housing protrudes; and
a mounting bracket having independent first and second sides, each of said first and second sides having an adjustment mechanism for adjusting a distance by which said housing protrudes from said cover plate.

7. The wiring device recited in claim 6, wherein one or more of said first and second sides of said mounting bracket include one or more stabilizing arms for supporting said cover plate.

8. The wiring device recited in claim 6 further comprising:
a unitary grounding bar having first and second sides corresponding to said first and second sides of said mounting bracket, each including an adjustment portion corresponding to the respective adjustment mechanisms of said first and second sides of said mounting bracket.

9. The wiring device recited in claim 8 further comprising:
a contact insulator disposed over said grounding bar and said first and second face terminals, said contact insulator hold said first and second face terminals in place.

10. The wiring device recited in claim 9 further comprising:
one or more tamper resistant mechanisms preventing anything from entering said first and second face terminals unless all of a hot plug contact, a neutral plug contact and a ground plug contact are inserted into corresponding apertures in said front section of said housing.

11. The wiring device recited in claim 1 wherein said switching device includes a relay rated to switch at least 12 amperes of current.

12. A wiring device comprising:
a housing including front and rear sections;
an AC power input for receiving AC power to the device from a power source external to said housing;
a flexible antenna for receiving a wireless control signal;
a circuit configured to receive said wireless control signal and output a low voltage control signal;
one or more AC power outputs for providing said AC power to a connected device;

a switching device receiving said wireless control signal and electrically connecting said AC power input to said one or more AC power outputs based on said wireless control signal;

a printed circuit board (PCB) supporting said switching device;

an insulator disposed between said PCB and said one or more AC power outputs and providing electrical isolation between said PCB and said one or more AC power outputs;

a cover plate having an aperture through which said front section of the housing protrudes; and a mounting bracket having independent first and second sides, each of said first and second sides having an adjustment mechanism for adjusting a distance by which said housing protrudes from said cover plate.

13. The wiring device of claim 12 wherein said flexible antenna includes a conductive wire.

14. The wiring device recited in claim 12 wherein said one or more AC power outputs includes a single unitary electrically conductive arm having two face terminals for providing electrical power to two respective electrical devices.

15. The wiring device recited in claim 12 wherein said one or more AC power outputs includes first and second face terminals for providing electrical power to two respective electrical devices, said first face terminal being activated based on said control signal and said second face terminal being continuously activated whenever AC power is connected to the device.

16. The wiring device recited in claim 12 further comprising:

a unitary grounding bar having first and second sides corresponding to said first and second sides of said mounting bracket, each including an adjustment portion corresponding to the respective adjustment mechanisms of said first and second sides of said mounting bracket;

a contact insulator disposed over said grounding bar and said first and second face terminals, said contact insulator hold said first and second face terminals in place; and a button actuator accessible through said front section of said housing and operable to activate said switching device when pressed.

* * * * *